(12) United States Patent
Wang

(10) Patent No.: US 12,133,231 B2
(45) Date of Patent: Oct. 29, 2024

(54) DATA TRANSMISSION METHOD, TERMINAL AND NETWORK SIDE DEVICE

(71) Applicant: DATANG MOBILE COMMUNICATIONS EQUIPMENT CO., LTD., Beijing (CN)

(72) Inventor: Lei Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 422 days.

(21) Appl. No.: 17/420,971

(22) PCT Filed: Jan. 7, 2020

(86) PCT No.: PCT/CN2020/070634
§ 371 (c)(1),
(2) Date: Jul. 6, 2021

(87) PCT Pub. No.: WO2020/143605
PCT Pub. Date: Jul. 16, 2020

(65) Prior Publication Data
US 2022/0104184 A1    Mar. 31, 2022

(30) Foreign Application Priority Data

Jan. 7, 2019  (CN) .......................... 201910011935.2

(51) Int. Cl.
*H04W 72/23*  (2023.01)
*H04L 5/00*  (2006.01)

(52) U.S. Cl.
CPC ........... *H04W 72/23* (2023.01); *H04L 5/0053* (2013.01)

(58) Field of Classification Search
CPC . H04W 72/046; H04L 5/0035; H04L 25/0204
See application file for complete search history.

(56) References Cited

U.S. PATENT DOCUMENTS

2018/0227035 A1    8/2018  Cheng et al.
2019/0222284 A1*   7/2019  Huang ................. H04W 72/23
(Continued)

FOREIGN PATENT DOCUMENTS

CN    102857319 A    1/2013
CN    106304349 A    1/2017
(Continued)

OTHER PUBLICATIONS

3rd Generation Partnership Project; Technical Specification Group Radio Access Network; NR; Physical layer procedures for data (Release 15), 3GPP TS 38.214 V15.3.0, Sep. 2018, all pages.
(Continued)

*Primary Examiner* — Yee F Lam
(74) *Attorney, Agent, or Firm* — Ladas & Parry, LLP

(57) ABSTRACT

A data transmission method, a terminal and a network side device are provided. The data transmission method includes: receiving, by a terminal, a first message, where the first message includes first transmission configuration indicator (TCI) state indication information; determining, by the terminal, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission; performing, by the termi-
(Continued)

nal, data transmissions in the K transmission layers according to the K TCI states respectively.

16 Claims, 7 Drawing Sheets

(56) References Cited

U.S. PATENT DOCUMENTS

| | | | |
|---|---|---|---|
| 2019/0254045 A1* | 8/2019 | Sadiq | H04W 72/0446 |
| 2019/0289476 A1 | 9/2019 | Chen et al. | |
| 2019/0379506 A1* | 12/2019 | Cheng | H04W 88/06 |
| 2020/0015200 A1* | 1/2020 | Vilaipornsawai | H04W 72/23 |
| 2020/0106559 A1* | 4/2020 | Vilaipornsawai | H04L 1/1896 |
| 2020/0205187 A1* | 6/2020 | Khoshnevisan | H04L 5/0035 |
| 2020/0267804 A1* | 8/2020 | Kakishima | H04B 7/088 |
| 2021/0119688 A1* | 4/2021 | Enescu | H04B 7/0404 |
| 2021/0168030 A1 | 6/2021 | Li | |

FOREIGN PATENT DOCUMENTS

| | | |
|---|---|---|
| CN | 108024268 A | 5/2018 |
| CN | 109076560 A | 12/2018 |
| WO | 2016188195 A | 12/2016 |

OTHER PUBLICATIONS

3rd Generation Partnership Project; Technical Specification Group Radio Access Network; NR; Medium Access Control (MAC) protocol specification (Release 15), 3GPP TS 38.321 V15.3.0, Sep. 2018, all pages.

3rd Generation Partnership Project; Technical Specification Group Radio Access Network; NR; Radio Resource Control (RRC) protocol specification (Release 15), 3GPP TS 38.331 V15.3.0, Sep. 2018, all pages.

First Office Action and Search Report from CN app. No. 201910011935.2, dated Dec. 17, 2020, with English translation from Global Dossier, all pages.

First Office Action and Search Report from TW app. No. 109100432, dated Oct. 14, 2021, with machine English translation, all pages.

International Search Report from PCT/CN2020/070634, dated Mar. 25, 2020, with English translation provided by WIPO, all pages.

Written Opinion of the International Searching Authority from PCT/CN2020/070634, dated Mar. 25, 2020, with English translation provided by WIPO, all pages.

International Preliminary Report on Patentability from PCT/CN2020/070634, dated Jun. 16, 2021, with English translation provided by WIPO, all pages.

European Search Report for European Patent Application 20739177.2 issued Jan. 21, 2022.

R1-1812256 "Enhancements on multi-TRP/Panel transmission" 3GPP TSG RAN WG1 Meeting #95, Spokane, USA, Nov. 12-16, 2018, Source: ZTE.

R1-1813442 "Multi-TRP Enhancements" 3GPP TSG-RAN WG 1 Meeting #95 Spokane, Wa, USA Nov. 12-16, 2018, Source: Qualcomm Incorporated.

Office action from corresponding South Korean Patent Application No. 10-2021-7021904 dated Apr. 24, 2024, and its English translation.

MediaTek Inc, R1-1812350, "Enhancements on multi-beam operations," 3GPP TSG RAN WG1 #95, 3GPP server publication date (Nov. 3, 2018), Spokane, US, Nov. 12-16, 2018.

* cited by examiner

DATA TRANSMISSION METHOD, TERMINAL AND NETWORK SIDE DEVICE

CROSS-REFERENCE TO RELATED APPLICATIONS

The present application is the U.S. national phase of PCT Application PCT/CN2020/070634 filed on Jan. 7, 2020, which claims a priority of Chinese patent application No. 201910011935.2 filed on Jan. 7, 2019, the disclosures of which are incorporated herein by reference in their entireties.

TECHNICAL FIELD

The present disclosure relates to the field of communication technology, and in particular to a data transmission method, a terminal and a network side device.

BACKGROUND

In the communication system, the network node may send the indication information of the transmission configuration indicator (Transmission Configuration Indicator, TCI) state to the terminal to indicate the TCI state, and the TCI state may include the beam direction. However, in the communication system in the related art, the indication information of the TCI state can only indicate one TCI state. In this way, the terminal only supports a transmission in one TCI state, and the transmission performance of the terminal is relatively low.

SUMMARY

A data transmission method, a terminal and a network side device are provided in the embodiments of the present disclosure, to solve the problem of relatively low transmission performance of the terminal.

A data transmission method is provided in an embodiment of the present disclosure, including:
receiving, by a terminal, a first message, where the first message includes first transmission configuration indicator (TCI) state indication information;
determining, by the terminal, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;
performing, by the terminal, data transmissions in the K transmission layers according to the K TCI states respectively.

Optionally, the TCI configuration information includes a plurality of groups of correspondence relationship combinations, and different correspondence relationship combinations correspond to different quantities of transmission layers; the first correspondence relationship combination is a correspondence relationship combination in which a quantity of transmission layers is K in the configuration information.

Optionally, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

Optionally, the first message further includes indication information configured to indicate a quantity of layers used for data transmission.

Optionally, different TCI states correspond to different network nodes.

Optionally, in a case that K is an integer greater than 1 and a same TCI state exists in the K TCI states, the terminal performs the data transmission with a same network node according to the same TCI state.

Optionally, prior to the receiving by the terminal the first message, the method further includes:
receiving, by the terminal, a second message, where the second message includes the TCI configuration information.

Optionally, prior to the receiving by the terminal the second message, the method further includes:
receiving, by the terminal, a third message, where the third message includes second TCI state indication information;
determining, by the terminal, the TCI state indicated by the second TCI state indication information, according to a second correspondence relationship combination, where the second correspondence relationship combination is a correspondence relationship combination, not belonging to the TCI configuration information, of the TCI states and the second TCI state indication information;
the receiving by the terminal the second message includes:
receiving, by the terminal, the second message, according to the TCI state indicated by the second TCI state indication information.

Optionally, the method further includes:
receiving, by the terminal, a media access control (MAC) control unit (CE), where the MAC CE is configured to change at least one group of correspondence relationships in the TCI configuration information.

A data transmission method is further provided in an embodiment of the present disclosure, including:
sending, by a network side device, a first message to a terminal, where the first message includes first transmission configuration indicator (TCI) state indication information, to enable the terminal to determine K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

performing, by the network side device, data transmissions in the K transmission layers according to the K TCI states respectively.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

Optionally, the first message further includes indication information configured to indicate a quantity of layers used for data transmission.

Optionally, different TCI states correspond to different network nodes.

Optionally, in a case that K is an integer greater than 1 and a same TCI state exists in the K TCI states, the terminal performs the data transmission with a same network node according to the same TCI state.

Optionally, prior to the sending by the network side device the first message to the terminal, the method further includes:

sending, by the network side device, a second message to the terminal, where the second message includes the TCI configuration information.

Optionally, prior to the sending by the network side device the second message to the terminal, the method further includes:

sending, by the network side device, a third message to the terminal, where the third message includes second TCI state indication information, to enable the terminal to determine, according to a second correspondence relationship combination, the TCI state indicated by the second TCI state indication information, where the second correspondence relationship combination is a correspondence relationship combination, not belonging to the TCI configuration information, of the TCI states and the second TCI state indication information, and the terminal receives the second message, according to the TCI state indicated by the second TCI state indication information.

Optionally, the method further includes:

sending, by the network side device, a media access control (MAC) control unit (CE) to the terminal, where the MAC CE is configured to change at least one group of correspondence relationships in the TCI configuration information.

A terminal is further provided in an embodiment of the present disclosure, including:

a first receiving module, configured to receive a first message, where the first message includes first transmission configuration indicator (TCI) state indication information;

a first determining module, configured to determine, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

a transmitting module, configured to perform data transmissions in the K transmission layers according to the K TCI states respectively.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the terminal further includes:

a second receiving module, configured to receive a second message, where the second message includes the TCI configuration information.

A network node is further provided in an embodiment of the present disclosure, including:

a first sending module, configured to send a first message to a terminal, where the first message includes first transmission configuration indicator (TCI) state indication information, to enable the terminal to determine K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

a transmitting module, configured to perform data transmissions in the K transmission layers according to the K TCI states respectively.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the network side device further includes:

a second sending module, configured to send a second message to the terminal, where the second message includes the TCI configuration information.

A terminal is further provided in an embodiment of the present disclosure, including: a transceiver, a memory, a processor and a program stored in the memory and executable on the processor, where the transceiver is configured to receive a first message, where the first message includes first transmission configuration indicator (TCI) state indication information;

the transceiver is configured to determine, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

the transceiver is further configured to perform data transmissions in the K transmission layers according to the K TCI states respectively;

or the transceiver is configured to receive a first message, where the first message includes first transmission configuration indicator (TCI) state indication information;

the processor is configured to determine, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

the transceiver is further configured to perform data transmissions in the K transmission layers according to the K TCI states respectively.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, prior to receiving the first message, the transceiver is further configured to receive a second message, where the second message includes the TCI configuration information.

A network node is further provided in an embodiment of the present disclosure, including: a transceiver, a memory, a processor and a program stored in the memory and executable on the processor, where the transceiver is configured to send a first message to a terminal, where the first message includes first transmission configuration indicator (TCI) state indication information, to enable the terminal to determine K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

the transceiver is further configured to perform data transmissions in the K transmission layers according to the K TCI states respectively.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, prior to sending the first message to the terminal, the transceiver is further configured to send a second message to the terminal, where the second message includes the TCI configuration information.

A computer-readable storage medium storing a computer program is further provided in an embodiment of the present disclosure, where the computer program is executed by a processor to perform data transmission method at the terminal side, or the computer program is executed by a processor to perform data transmission method at the network node side.

According to the embodiment of the present disclosure, the terminal receives a first message, where the first message includes first transmission configuration indicator (TCI) state indication information; the terminal determines K TCI states of K transmission layers indicated by the first TCI state indication information, according to a first correspondence relationship combination included in the TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission; the terminal performs data transmissions in the K transmission layers according to the K TCI states respectively.

Since the above-mentioned TCI configuration information includes at least a correspondence relationship combination configured to indicate the correspondence relationships between the TCI states of a plurality of transmission layers and the first TCI state indication information, therefore the above-mentioned first TCI state indication information may indicate the TCI states of a plurality of transmission layers, and the terminal may perform data transmission in a plurality of transmission layers according to their respective TCI states, so as to improve the transmission performance of the terminal.

DETAILED DESCRIPTION

In order to make the technical problems, technical solutions, and advantages to be solved by the present disclosure clearer, a detailed description will be given below in conjunction with the accompanying drawings and specific embodiments.

Figure 1:
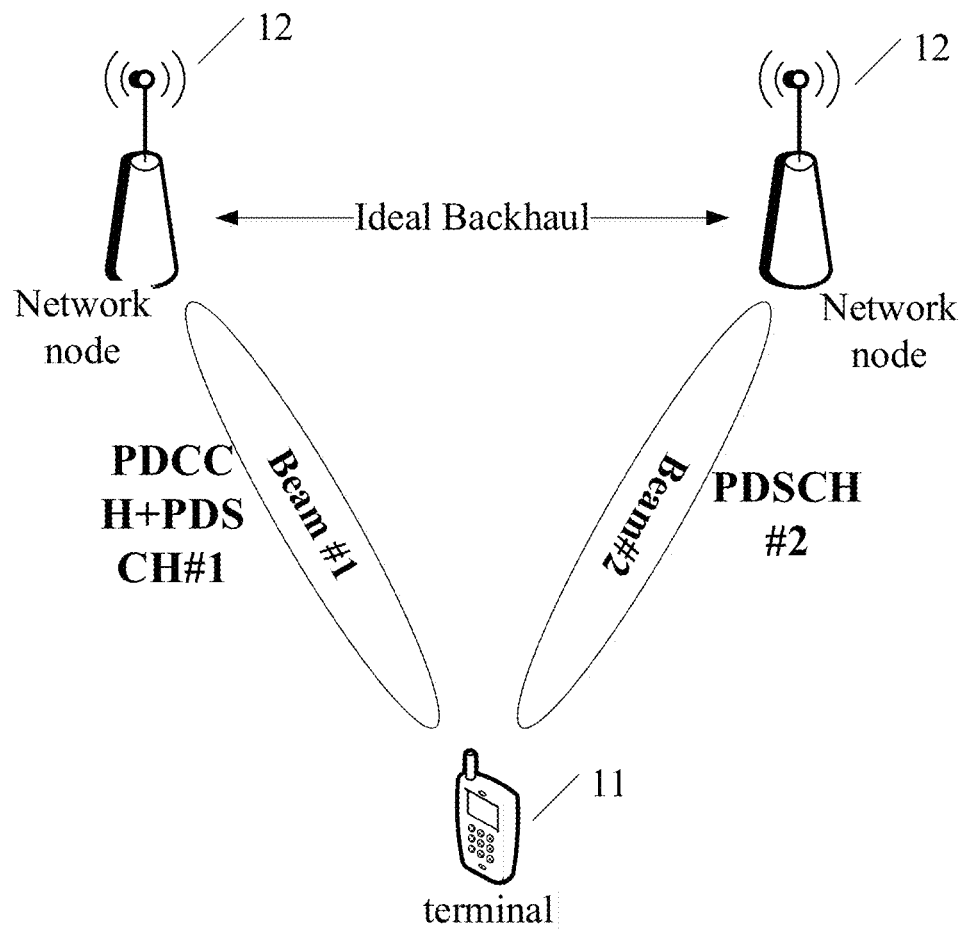
FIG. 1 is a schematic diagram of a network structure applicable to an embodiment of the present disclosure.

Referring to FIG. 1, FIG. 1 is a schematic diagram of a network structure applicable to an embodiment of the present disclosure. As shown in FIG. 1, it includes a terminal 11 and at least one network node 12, where the terminal 11 may be a User Equipment (UE) or other Terminal devices, such as: mobile phones, tablet computers (Tablet Personal Computer), laptop computers (Laptop Computer), personal digital assistants (personal digital assistant, PDA), mobile Internet devices (Mobile Internet Device, MID) or wearable terminal-side devices, it should be noted that the specific types of terminals are not limited in the embodiments of the present disclosure. The network node 12 may be a Transmission Reception Point (TRP) or a network node. It should be noted that the specific types of network nodes are not limited in the embodiments of the present disclosure. In addition, when a plurality of network nodes 12 are included, the terminal 11 can transmit with a plurality of network nodes 12, and the a plurality of network nodes 12 can also transmit, for example, as shown in FIG. 1, there is a backhaul line (Backhaul) between two network nodes 12, and optionally, the backhaul line may be an ideal backhaul line (Ideal Backhaul). In addition, the aforementioned at least one network node 12 may be a network node managed by the same network side device, for example: a network node managed by the same base station.

In addition, in FIG. 1, a network node sends a physical downlink shared channel (Physical downlink shared channel, PDSCH) and a physical downlink control channel (Physical downlink control channel, PDCCH), and another network node sends a PDSCH for example. Among them, the PDCCH may be configured to carry the first message and the third message provided in the embodiment of the present disclosure, for example, DCI.

Figure 2:
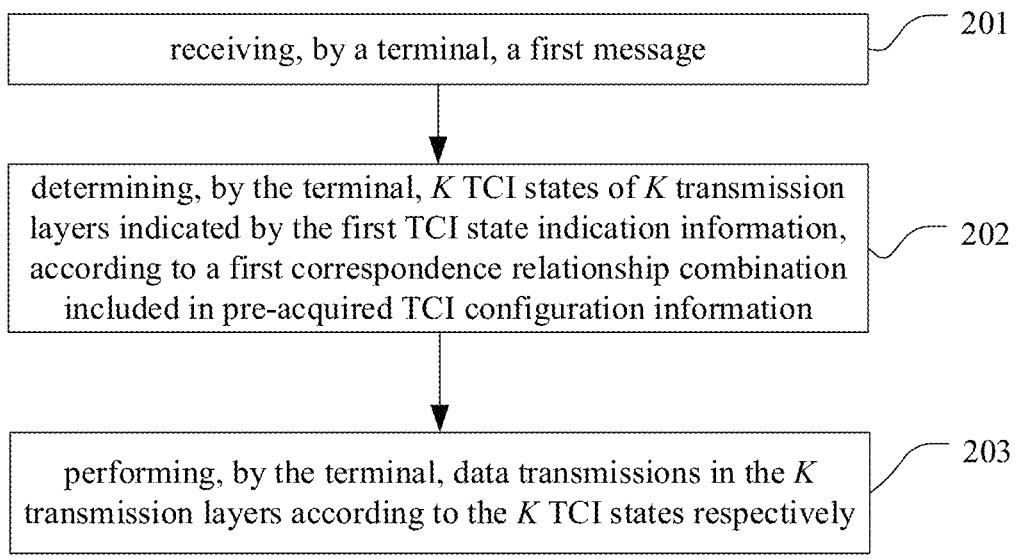
FIG. 2 is a flowchart of a data transmission method in an embodiment of the present disclosure.

FIG. 2 is a flowchart of a data transmission method in an embodiment of the present disclosure. As shown in FIG. 2, it includes the following steps:

201: receiving, by a terminal, a first message, where the first message includes first transmission configuration indicator (TCI) state indication information;

202: determining, by the terminal, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

203: performing, by the terminal, data transmissions in the K transmission layers according to the K TCI states respectively.

Step 201 may be receiving a first message sent by a network side device or a certain network node, for example: receiving a first message sent by a base station. The foregoing first message may be Downlink Control Information (DCI) or other downlink signaling, which is not limited.

The first TCI state indication information may be bit information carried in the TCI state indication field of the first message. Optionally, the first TCI state indication information is 3 bits, but it is not limited. For example, in order to achieve greater flexibility, the length of the indication field can be expanded accordingly, for example, expanded to 4 bits or 5 bits, and so on.

The above-mentioned TCI configuration information may be obtained in advance before Step 201 is performed, for example: TCI configuration information pre-configured by the network side for the above-mentioned terminal, the above-mentioned TCI configuration information may include one or more groups of correspondence relationship combinations. However, the above-mentioned TCI configuration information includes at least a correspondence relationship combination configured to indicate the correspondence relationship between the TCI states of a plurality of transmission layers and the first TCI state indication information, that is, through the correspondence relationship combination, it is able to determine the TCI state of each of the plurality of transmission layers indicated by the first TCI state indication information.

A quantity of layers used for the above data transmission may be a quantity of layers used for data transmission in step 203. Specifically, a quantity of layers used for the above data transmission may correspond to the above first message, for example: the first message It may also include indication information configured to indicate a quantity of layers used for the data transmission, such as indicating a quantity of layers used for data transmission through information such as an antenna port (antenna port) of the first message. Of course, in the embodiments of the present disclosure, a quantity of layers used for the data transmission is not limited to be indicated by the first message. For example, a quantity of layers used for data transmission may also be indicated by other messages.

The above-mentioned first correspondence relationship combination is the correspondence relationship combination determined in the above-mentioned TCI configuration information according to a quantity of layers used in the data transmission (i.e., the above-mentioned K). For example, when the above-mentioned TCI configuration information includes a plurality of groups of correspondence relationship combinations, a correspondence relationship combination is configured to indicate correspondence relationships between the TCI states of K transmission layers and the first TCI state indication information. When the above-mentioned TCI configuration information only includes the correspondence relationship combination configured to indicate the correspondence relationship between the TCI states of the plurality of transmission layers and the first TCI state indication information, the correspondence relationship combination is the above-mentioned first correspondence relationship combination. In different situations in actual applications, the value of the above-mentioned K is different, for example: the above-mentioned K is an integer greater than or equal to 1.

It should be noted that any correspondence relationship combination in the embodiments of the present disclosure may include a plurality of correspondence relationships, and each correspondence relationship includes the relationship between a value of the above-mentioned first TCI state indication information and the TCI state of the transmission layer, for example: when the first TCI state indication information includes X values, it may include X correspondence relationships.

In addition, the above-mentioned correspondence relationship combination configured to indicate correspondence relationships between TCI states of a plurality of transmission layers and the first TCI state indication information may have the correspondence relationship where the TCI states of a plurality of transmission layers are the same, that is, the TCI states of a plurality of transmission layers corresponding to a value of a certain first TCI state indication information are the same. However, there are at least different correspondence relationships of TCI states among the TCI states of the a plurality of transmission layers, that is, there may be different TCI states in the TCI states of a plurality of transmission layers corresponding to a value of a certain first TCI state indication information, so that a value of one piece of first TCI state indication information may indicate different TCI states. For example, different transmission layers have different TCI states, or some correspondence relationships include transmission layers with different TCI states, and also include transmission layers with the same TCI state.

In the following, the above K is equal to 3, and the first TCI state indication information is 3 bits as an example, the above first correspondence may include the content shown in Table 1:

TABLE 1

| binary information carried in the TCI state indicator filed | Layer1 | Layer2 | Layer3 |
|---|---|---|---|
| 000 | TCI#1 | TCI#1 | TCI#1 |
| 001 | TCI#2 | TCI#2 | TCI#2 |
| 010 | TCI#3 | TCI#3 | TCI#12 |

TABLE 1-continued

| binary information carried in the TCI state indicator filed | Layer1 | Layer2 | Layer3 |
|---|---|---|---|
| 011 | TCI#4 | TCI#10 | TCI#10 |
| 100 | TCI#5 | TCI#5 | TCI#12 |
| 101 | TCI#6 | TCI#6 | TCI#20 |
| 110 | TCI#7 | TCI#23 | TCI#23 |
| 111 | TCI#8 | TCI#25 | TCI#25 |

Among them, each row above represents a correspondence relationship.

The foregoing determination of the K TCI states of the K transmission layers indicated by the first TCI state indication information may be determining the TCI state of each of the K transmission layers indicated by the first TCI state indication information.

However, the foregoing Step 203 may be: performing the data transmission in each of the foregoing K transmission layers according to respective TCI states. Optionally, the foregoing data transmission may be PDSCH transmission.

In addition, it should be noted that in the embodiments of the present disclosure, the TCI state may indicate the beam direction. In this way, when the aforementioned K is an integer greater than 1 and the aforementioned K TCI states are different, the data transmission in K beam directions can be realized, for example: data reception in K beam directions can be realized.

In the embodiments of the present disclosure, through the above steps, it is able to use the corresponding correspondence relationship combination according to a quantity of layers used for data transmission, so that when the quantities of layers used for data transmission are different, the first TCI state indication information can indicate different TCI states. In this way, a joint coding method can be used to indicate the TCI state information of different transmission layers. In addition, the above TCI configuration information at least includes a correspondence relationship combination configured to indicate correspondence relationships between TCI states of a plurality of transmission layers and the first TCI state indication information, so that the above-mentioned first TCI state indication information may indicate the TCI states of a plurality of transmission layers, the terminal may transmit data in a plurality of transmission layers according to the respective TCI states, so as to improve the transmission performance of the terminal.

As an optional embodiment, the above-mentioned TCI configuration information includes a plurality of groups of correspondence relationship combinations, and different correspondence relationship combinations correspond to different quantities of transmission layers;

The first correspondence relationship combination is a correspondence relationship combination in which a quantity of transmission layers is K in the configuration information.

For example: 4 correspondence relationship combinations are included, where the correspondence relationship combination 1 represents the correspondence relationship between the TCI state of one transmission layer and the first TCI state indication information, the correspondence relationship combination 2 represents the correspondence relationships between the TCI states of two transmission layers and the first TCI, the correspondence relationship combination 3 represents the correspondence relationships between the TCI states of three transmission layers and the first TCI, and the correspondence relationship combination 4 represents the correspondence relationships between the TCI states of four transmission layers and the first TCI. That is to say, the correspondence relationship combination corresponding to the quantity of transmission layers being m is configured to indicate the correspondence relationships between the TCI states of the m transmission layers and the first TCI state indication information.

The above-mentioned first correspondence relationship combination is a correspondence relationship combination corresponding to K transmission layers and selected from the TCI configuration information according to the K (the quantity of layers used for data transmission), e.g., the correspondence relationship between the binary information of the first TCI state indication information and the layer when a quantity of layers used for data transmission is 1; for another example, when a quantity of layers used for data transmission is 2, the correspondence relationship between the binary information of the first TCI state indication information and the two layers, and so on, different numbers of layers correspond to different configuration information.

In addition, in the embodiments of the present disclosure, the correspondence relationship combinations can be described in the form of tables, and each table is configured to indicate the correspondence relationships between the TCI state of a certain quantity of transmission layers and the first TCI state indication information, that is, different layers are configured with different tables. In this way, different tables can be selected to determine the TCI state indicated by the binary bits of the first TCI state indication information according to a quantity of layers used for data transmission.

Taking the above TCI configuration information including 4 groups of correspondence relationship combinations and the above first TCI state indication information being the TCI state indication field as an example, the above TCI configuration may include the above Table 1, and may also include the following Table 2, Table 3 and Table 4:

TABLE 2

| binary information carried in the TCI state indicator filed | Layer1 |
|---|---|
| 000 | TCI#1 |
| 001 | TCI#2 |
| 010 | TCI#3 |
| 011 | TCI#4 |
| 100 | TCI#5 |
| 101 | TCI#6 |
| 110 | TCI#7 |
| 111 | TCI#8 |

TABLE 3

| binary information carried in the TCI state indicator filed | Layer1 | Layer2 |
|---|---|---|
| 000 | TCI#1 | TCI#1 |
| 001 | TCI#2 | TCI#2 |
| 010 | TCI#3 | TCI#11 |
| 011 | TCI#4 | TCI#24 |
| 100 | TCI#5 | TCI#32 |
| 101 | TCI#6 | TCI#33 |
| 110 | TCI#7 | TCI#23 |
| 111 | TCI#8 | TCI#25 |

TABLE 4

| binary information carried in the TCI state indicator filed | Layer1 | Layer2 | Layer3 | Layer4 |
|---|---|---|---|---|
| 000 | TCI#1 | TCI#1 | TCI#1 | TCI#1 |
| 001 | TCI#2 | TCI#2 | TCI#2 | TCI#2 |
| 010 | TCI#3 | TCI#3 | TCI#12 | TCI#12 |
| 011 | TCI#4 | TCI#4 | TCI#10 | TCI#10 |
| 100 | TCI#5 | TCI#5 | TCI#12 | TCI#12 |
| 101 | TCI#6 | TCI#6 | TCI#20 | TCI#20 |
| 110 | TCI#7 | TCI#23 | TCI#23 | TCI#23 |
| 111 | TCI#8 | TCI#8 | TCI#8 | TCI#25 |

Each of the above tables may represent a set of correspondence relationship combinations, and the quantity of transmission layers corresponding to different tables are different.

It should be noted that the correspondence relationship between the TCI state and the first TCI state indication information shown in the above table is only an example, which is not specifically limited. In addition, the correspondence relationship in any correspondence relationship combination in the embodiments of the present disclosure can be adjusted accordingly according to actual conditions.

Further, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

For example, when the maximum quantity of transmission layers supported by the terminal is 4, 4 correspondence relationship combinations may be included, and each correspondence relationship combination corresponds to a different quantity of transmission layers.

Since the quantity of correspondence relationship combinations is the same as the maximum quantity of transmission layers supported by the terminal, it is able to support the terminal to perform transmission layers on more transmission layers, and also support the terminal to perform data transmission in more TCI states.

As an optional embodiment, different TCI states correspond to different network nodes.

The aforementioned network node may be a TRP.

It should be noted that, for the terminal, the terminal can only know the TCI state, such as the beam direction. After determining the TCI state of each transmission layer, the terminal only needs to perform data transmission in the TCI state of each transmission layer, but does not need to know the network node corresponding to each TCI state.

In this way, when the TCI states of a plurality of transmission layers are different, it is able to support the terminal to perform data transmission with different network nodes at different transmission layers, thereby improving the data transmission performance of the terminal.

In addition, it can also be realized that, through one of the above-mentioned first messages, it is able to support the terminal to perform the data transmission with different network nodes, without sending the first message to the terminal by each network node, so as to save transmission resources.

Further, in a case that K is an integer greater than 1 and a same TCI state exists in the K TCI states, the terminal performs the data transmission with a same network node according to the same TCI state.

In this embodiment, if the same TCI state exists, the data transmission can be performed with the same network node on the transmission layers corresponding to the same TCI state. For example, as shown in Table 4, when the value of the first TCI state indication information is 000 or 001, the terminal performs the data transmission with the same network node at all the four transmission layers. In this way, the value of the first TCI state indication information can be flexibly set according to actual progress, so as to improve the flexibility of TCI state indication.

It should be noted that the same TCI state is used for data transmission with the same network node, and different TCI states correspond to different network nodes, which can simply realize a flexible handover between a single network node (for example: TRP) transmission and multi-network node transmission, without introducing new indication signaling, so as to reduce the complexity. Suppose that in slot n, the network side only sends data on TRP #1 or TRP #2. At this time, the base station only needs to indicate, through a DCI, to the terminal that the TCI combination includes only one TCI state. For example, when the transmission is on layer 2 to layer 4, the state of the TCI state indication information field carried in the DCI is 000 or 001. Of course, as mentioned above, the above configuration is only an example. Specifically, the network side can flexibly configure various combinations according to actual needs. For example, 000-001 represents a single TRP transmission, 010-111 represents multiple TRP transmissions, and for another example, 000-011 represents a single TRP transmission, and 100-111 represents multiple TRP transmissions, which is not limited in the embodiment of the present disclosure.

As an optional embodiment, prior to the receiving by the terminal the first message, the method further includes:
  receiving, by the terminal, a second message, where the second message includes the TCI configuration information.

The foregoing second message may be high-layer signaling, such as RRC signaling, where the foregoing second message may be sent by the network side, for example, sent by a network side device (e.g., a base station) or a network node.

It should be noted that the above TCI configuration information does not limit the TCI state of the transmission layer, that is, the TCI state of each transmission layer can be configured according to actual conditions.

For example, when the network side configures the correspondence relationship between the transmission layer and the TCI state through a high-layer signaling, the choice of the TCI state is not limited. The network side can evaluate which TCI state combinations are applicable to the terminal, through processes such as beam management, initial access, or beam failure recovery (BFR). The data transmitted by the layers with the same TCI state comes from the PDSCH transmitted by the same TRP.

After receiving the first message (for example, DCI), the terminal can determine a quantity of layers used for data transmission, according to information such as the antenna port in the first message. For example, if the number of antenna ports is 2, the PDSCH adopts a two-layer transmission, and then it is determined that the correspondence relationship between the information carried in the TCI state indication field (i.e., the above-mentioned first TCI state indication information) and the layer is determined by the configuration table 3 above. Further, assuming that the information carried in the TCI state indication field is 010, it means that the terminal needs to receive the data of Layer 1 on the beam corresponding to TCI #3, and receive the data of Layer 2 on the beam corresponding to TCI #11.

As shown in the above table, the combination of TCI state is not limited. For example, when a terminal receives data of a plurality of layers, if the combination configured by the high-layer signaling is that the TCI states of different layers are the same, the data of the plurality of layers are all sent by one TRP. For example, a quantity of layers sent by the PDSCH is 4, and the TCI state indication field carried in the DCI is 000, it means that the data of layers 1 to 4 are all sent on the beam corresponding to TCI #1.

Further, prior to the receiving by the terminal the second message, the method further includes:
  receiving, by the terminal, a third message, where the third message includes second TCI state indication information;
  determining, by the terminal, the TCI state indicated by the second TCI state indication information, according to a second correspondence relationship combination, where the second correspondence relationship combination is a correspondence relationship combination, not belonging to the TCI configuration information, of the TCI states and the second TCI state indication information;
  the receiving by the terminal the second message includes:
  receiving, by the terminal, the second message, according to the TCI state indicated by the second TCI state indication information.

The foregoing third message may also be a DCI, and the foregoing second TCI state indication information may refer to the description of the foregoing first TCI state indication information, which is not repeated here.

In this embodiment, since the second correspondence relationship combination is a correspondence relationship combination that does not belong to the TCI configuration information, it is able to parse the first message and the third message through different methods, thereby improving the performance of the terminal.

For example, when the above-mentioned TCI configuration information is configured through the high-layer signaling, the terminal can parse the TCI state indication field carried in the third message (e.g., DCI) based on the current understanding, for example: all layers used for PDSCH transmission are transmitted in the same TCI state indicated by the TCI.

As an optional embodiment, the above method further includes:
  receiving, by the terminal, a media access control (MAC) control unit (CE), where the MAC CE is configured to change at least one group of correspondence relationships in the TCI configuration information.

The above-mentioned MAC CE is sent by the network side, for example, sent by the network side device.

In this embodiment, it is able to modify the TCI configuration information through the MAC CE, so that the TCI state combinations available to the terminal are more flexible and changeable.

It should be noted that, in the embodiments of the present disclosure, there are no restrictions on the quantity of network nodes (for example, TRP), the quantity of PDSCH transmission layers, and the quantity of the combination thereof.

In addition, the length of the TCI state information field configured to indicate the corresponding TCI states of a plurality of layers carried in the first message is not limited to 3 bits. In order to achieve greater flexibility, the length of the information field can be extended accordingly, for example, extended to 4 bit, then the combination of the correspondence relationship between the TCI state configured by the high-layer signaling and each layer should be 24=16; or the length of the information field is extended to 5 bits, then the combination of the correspondence relationship between the TCI state configured by the high-layer signaling and each layer should be 25=32.

In the embodiments of the present disclosure, the terminal is able to know the TCI state corresponding to each data transmission layer, according to the correspondence relationship between the TCI state and the layer configured according to the high-layer signaling (i.e., the above-mentioned TCI configuration) and TCI state indication field carried in the DCI (i.e., the above-mentioned first TCI state indication information), for example: beam direction.

In addition, the base station configures the correspondence relationship between the TCI and the layer through the high-layer signaling, and indicates the TCI information corresponding to a plurality of layers through a TCI state indication field carried in the DCI.

In the embodiments of the present disclosure, through the method of indicating the TCI states of different TRP data by means of joint coding, it is able to achieve the balance of the flexibility field signaling overhead, and can realize the flexibility switching between a multi-TRP transmission and a single TRP transmission.

According to the embodiment of the present disclosure, the terminal receives a first message, where the first message includes first transmission configuration indicator (TCI) state indication information; the terminal determines K TCI states of K transmission layers indicated by the first TCI state indication information, according to a first correspondence relationship combination included in the TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission; the terminal performs data transmissions in the K transmission layers according to the K TCI states respectively. Since the above-mentioned TCI configuration information includes at least a correspondence relationship combination configured to indicate the correspondence relationships between the TCI states of a plurality of transmission layers and the first TCI state indication information, therefore the above-mentioned first TCI state indication information may indicate the TCI states of a plurality of transmission layers, and the terminal may perform data transmission in a plurality of transmission layers according to their respective TCI states, so as to improve the transmission performance of the terminal.

Figure 3:
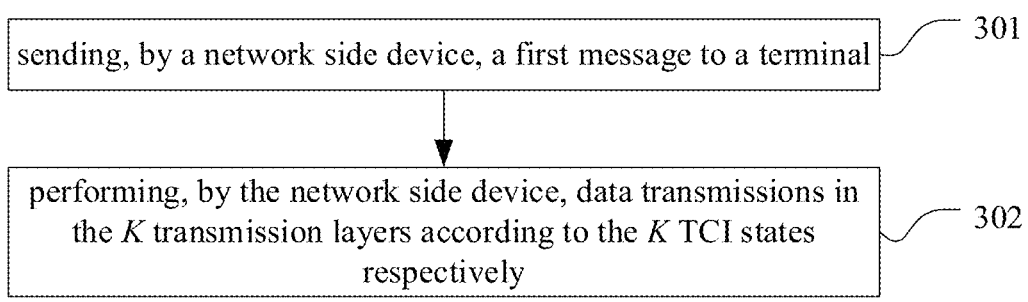
FIG. 3 is a flowchart of another data transmission method in an embodiment of the present disclosure.

Referring to FIG. 3 which is a flowchart of another data transmission method in an embodiment of the present disclosure. As shown in FIG. 3, the method includes the following steps:

301: sending, by a network side device, a first message to a terminal, where the first message includes first transmission configuration indicator (TCI) state indication information, to enable the terminal to determine K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

302: performing, by the network side device, data transmissions in the K transmission layers according to the K TCI states respectively.

It should be noted that the K TCI states of the above K transmission layers may be known to the network side device. For example, the network side device may send the corresponding first TCI state indication information to the terminal after knowing the K TCI states of the above K transmission layers.

Since different TCI states can correspond to different network nodes (for example, TRP), in Step 302, when the K TCI states are different TCI states, the network side device may perform data transmission through different network nodes.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

Optionally, the first message further includes indication information configured to indicate a quantity of layers used for data transmission.

Optionally, different TCI states correspond to different network nodes.

Optionally, in a case that K is an integer greater than 1 and a same TCI state exists in the K TCI states, the terminal performs the data transmission with a same network node according to the same TCI state.

Optionally, prior to the sending by the network side device the first message to the terminal, the method further includes:

sending, by the network side device, a second message to the terminal, where the second message includes the TCI configuration information.

Optionally, prior to the sending by the network side device the second message to the terminal, the method further includes:

sending, by the network side device, a third message to the terminal, where the third message includes second TCI state indication information, to enable the terminal to determine, according to a second correspondence relationship combination, the TCI state indicated by the second TCI state indication information, where the second correspondence relationship combination is a correspondence relationship combination, not belonging to the TCI configuration information, of the TCI states and the second TCI state indication information, and the terminal receives the second message, according to the TCI state indicated by the second TCI state indication information.

Optionally, the method further includes:

sending, by the network side device, a media access control (MAC) control unit (CE) to the terminal, where the MAC CE is configured to change at least one group of correspondence relationships in the TCI configuration information.

It should be noted that this embodiment is used as an embodiment of the network side device corresponding to the embodiment shown in FIG. 2. For specific embodiments, refer to the related description of the embodiment shown in FIG. 2. In order to avoid repetitive description, this embodiment will not be repeated, and the same beneficial effect can be achieved.

Figure 4:
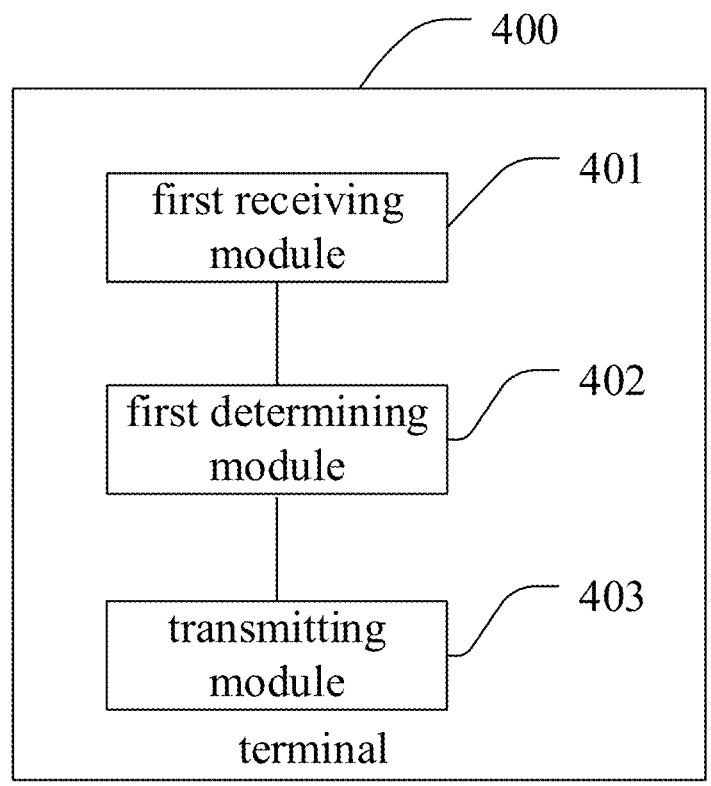
FIG. 4 is a schematic view of a terminal in an embodiment of the present disclosure.
Figure 8:
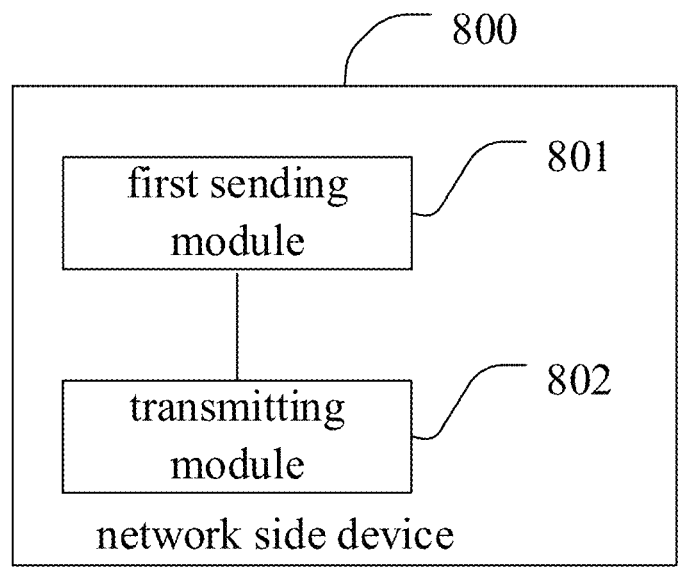
FIG. 8 is a schematic view of a network side device in an embodiment of the present disclosure.

Referring to FIG. 4 which is a schematic view of a terminal in an embodiment of the present disclosure. As shown in FIG. 8, the terminal 400 includes:

a first receiving module 401, configured to receive a first message, where the first message includes first transmission configuration indicator (TCI) state indication information;

a first determining module 402, configured to determine, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

a transmitting module 403, configured to perform data transmissions in the K transmission layers according to the K TCI states respectively.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

Optionally, the first message further includes indication information configured to indicate a quantity of layers used for data transmission.

Optionally, different TCI states correspond to different network nodes.

Optionally, in a case that K is an integer greater than 1 and a same TCI state exists in the K TCI states, the terminal performs the data transmission with a same network node according to the same TCI state.

Figure 5:
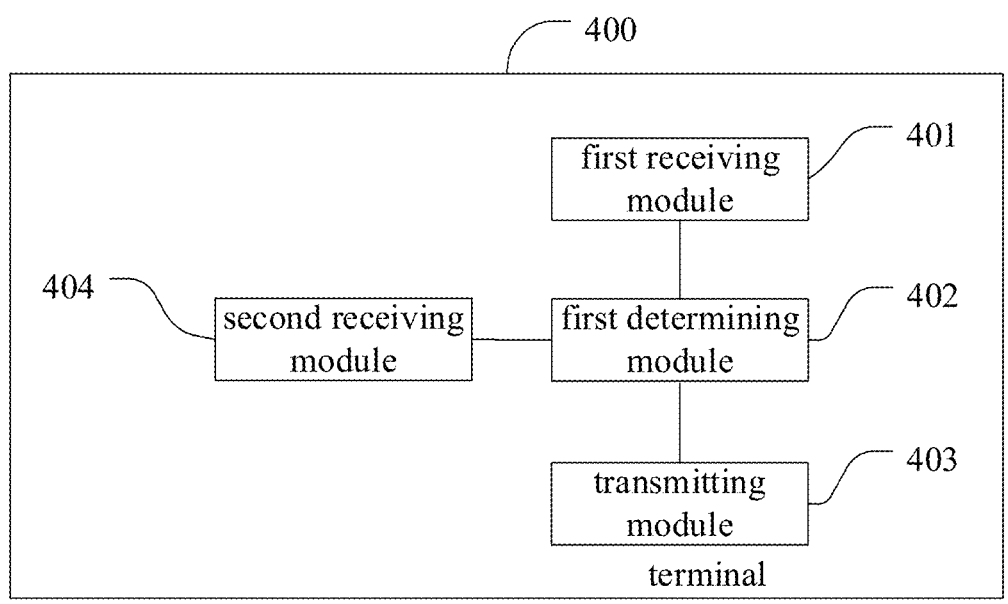
FIG. 5 is a schematic view of another terminal in an embodiment of the present disclosure.

Optionally, as shown in FIG. 5, the terminal 400 further includes:

a second receiving module 404, configured to receive a second message, where the second message includes the TCI configuration information.

Figure 6:
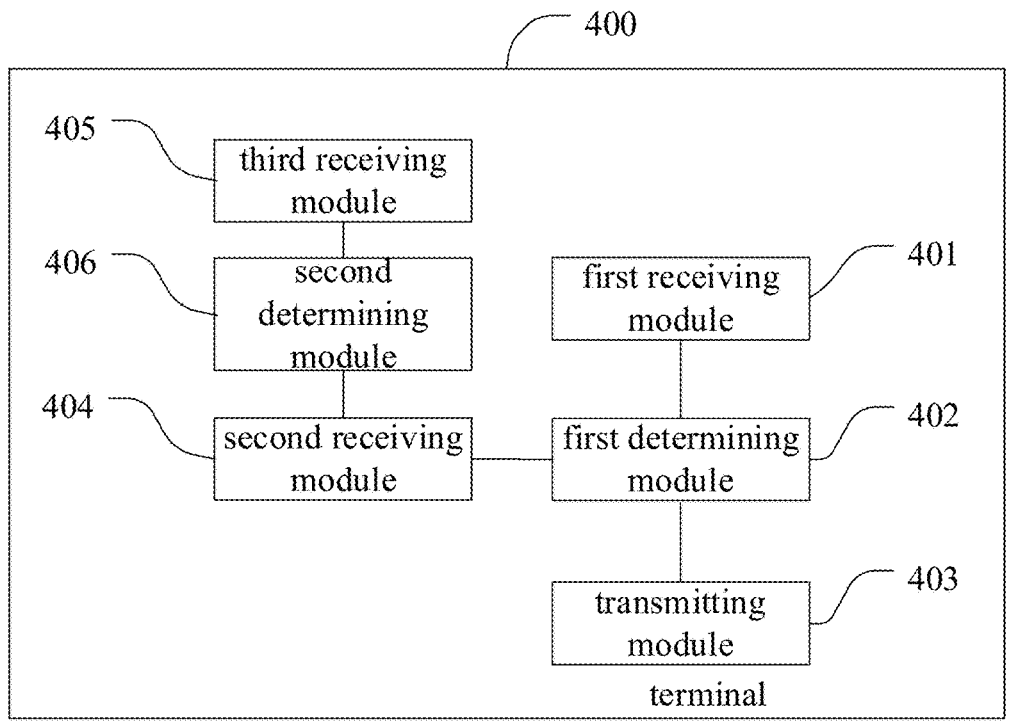
FIG. 6 is a schematic view of another terminal in an embodiment of the present disclosure.

Optionally, as shown in FIG. 6, the terminal 400 further includes:

a third receiving module 405, configured to receive a third message, where the third message includes second TCI state indication information;

a second determining module 406, configured to determine the TCI state indicated by the second TCI state indication information, according to a second correspondence relationship combination, where the second correspondence relationship combination is a correspondence relationship combination, not belonging to the TCI configuration information, of the TCI states and the second TCI state indication information;

the second receiving module 404 is configured to receive the second message, according to the TCI state indicated by the second TCI state indication information.

Figure 7:
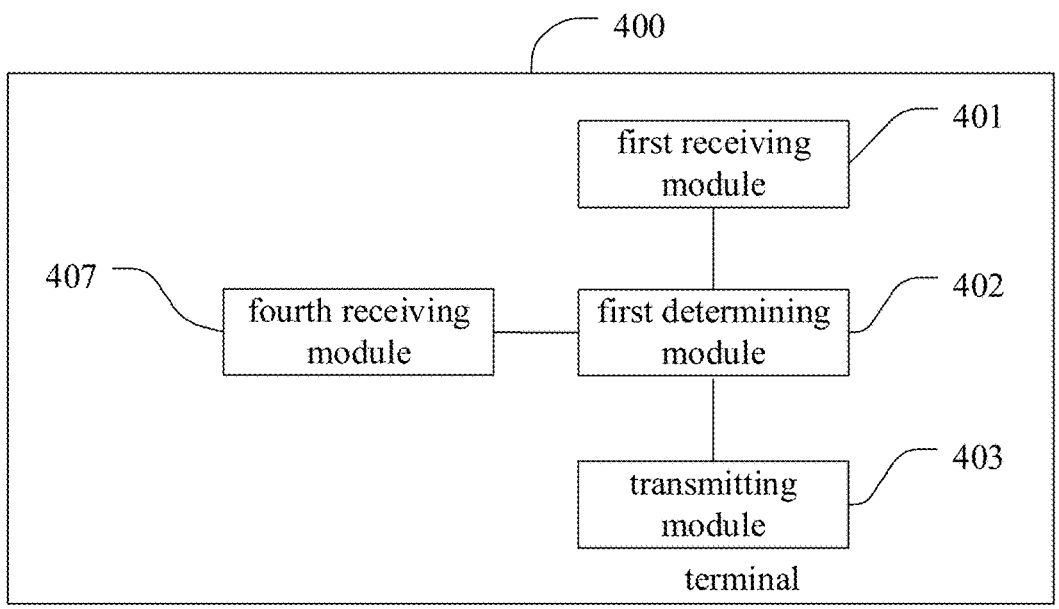
FIG. 7 is a schematic view of another terminal in an embodiment of the present disclosure.

Optionally, as shown in FIG. 7, the terminal 400 further includes:

a fourth receiving module 407, configured to receive a media access control (MAC) control unit (CE), where the MAC CE is configured to change at least one group of correspondence relationships in the TCI configuration information.

It should be noted that the above-mentioned terminal 800 in this embodiment may be a terminal of any embodiment in the method embodiment in the embodiment of the present disclosure. Any embodiment of the terminal in the method embodiment in the embodiment of the disclosure may be used by the foregoing terminal 800 to realize and achieve the same beneficial effects, which will not be repeated here.

Referring to FIG. 8 which is a schematic view of a network side device in an embodiment of the present disclosure. As shown in FIG. 8, the network side device 800 includes:

a first sending module 801, configured to send a first message to a terminal, where the first message includes first transmission configuration indicator (TCI) state indication information, to enable the terminal to determine K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

a transmitting module 802, configured to perform data transmissions in the K transmission layers according to the K TCI states respectively.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

Optionally, the first message further includes indication information configured to indicate a quantity of layers used for data transmission.

Optionally, different TCI states correspond to different network nodes.

Optionally, in a case that K is an integer greater than 1 and a same TCI state exists in the K TCI states, the terminal performs the data transmission with a same network node according to the same TCI state.

Figure 9:
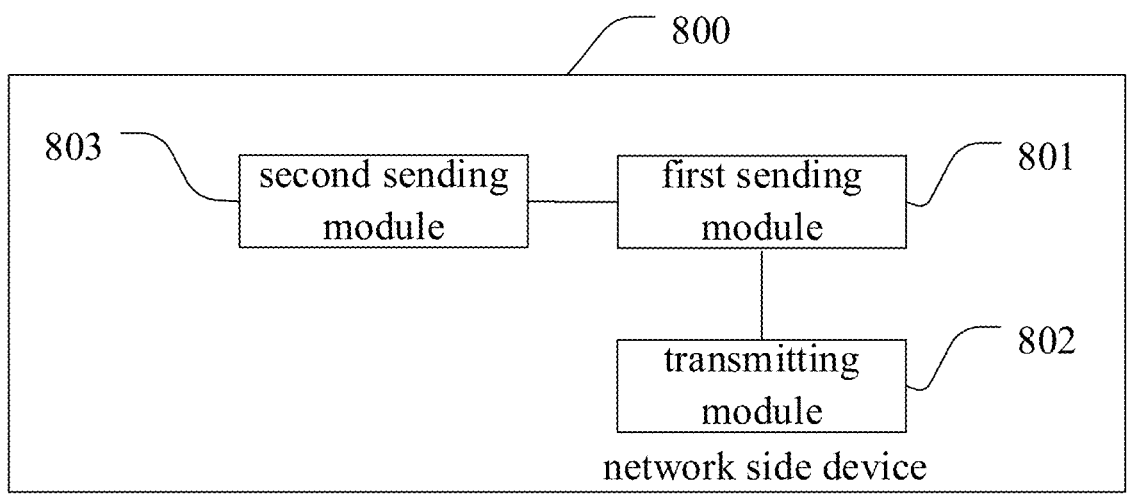
FIG. 9 is a schematic view of another network side device in an embodiment of the present disclosure.

Optionally, as shown in FIG. 9, the network side device 800 further includes:

a second sending module 803, configured to send a second message to the terminal, where the second message includes the TCI configuration information.

Figure 10:
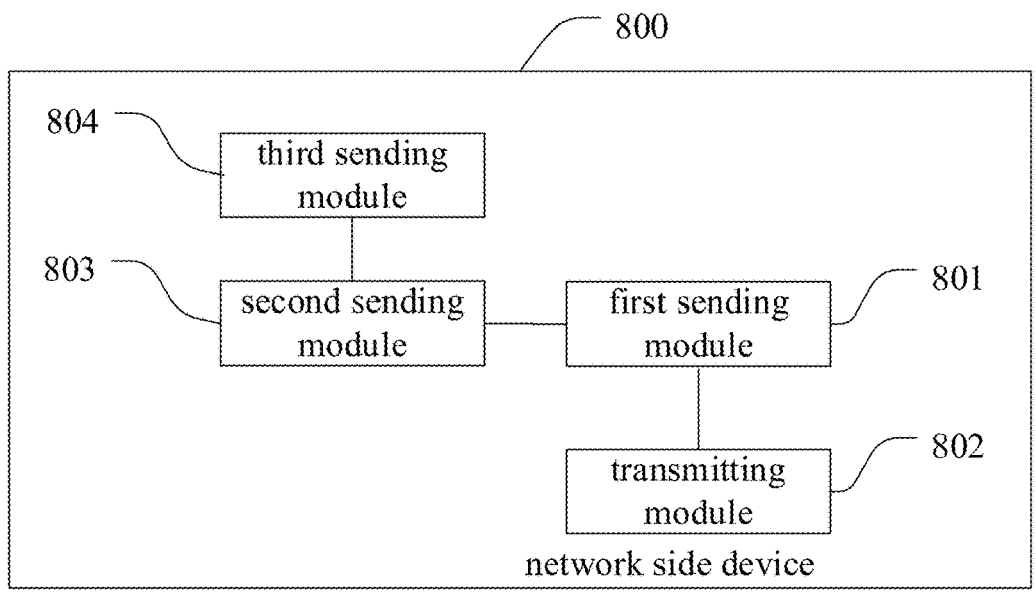
FIG. 10 is a schematic view of another network side device in an embodiment of the present disclosure.

Optionally, as shown in FIG. 10, the network side device 800 further includes:

a third sending module 804, configured to send a third message to the terminal, where the third message includes second TCI state indication information, to enable the terminal to determine, according to a second correspondence relationship combination, the TCI state indicated by the second TCI state indication information, where the second correspondence relationship combination is a correspondence relationship combination, not belonging to the TCI configuration information, of the TCI states and the second TCI state indication information, and the terminal receives the second message, according to the TCI state indicated by the second TCI state indication information.

Figure 11:
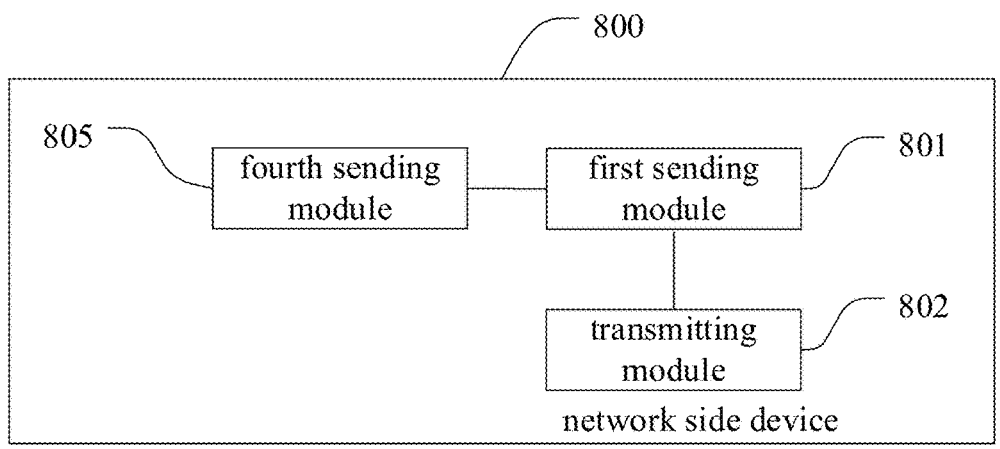
FIG. 11 is a schematic view of another network side device in an embodiment of the present disclosure.

Optionally, as shown in FIG. 11, the network side device 800 further includes:

a fourth sending module 805, configured to send a media access control (MAC) control unit (CE) to the terminal, where the MAC CE is configured to change at least one group of correspondence relationships in the TCI configuration information.

It should be noted that the above-mentioned network side device 900 in this embodiment may be a terminal of any embodiment in the method embodiment in the embodiments of the present disclosure. Any embodiment of the network side device in the method embodiment in the embodiment of the disclosure may be used by the present disclosure. The above-mentioned network side device 900 in the embodiment realizes and achieves the same beneficial effects, which will not be repeated here.

Figure 12:
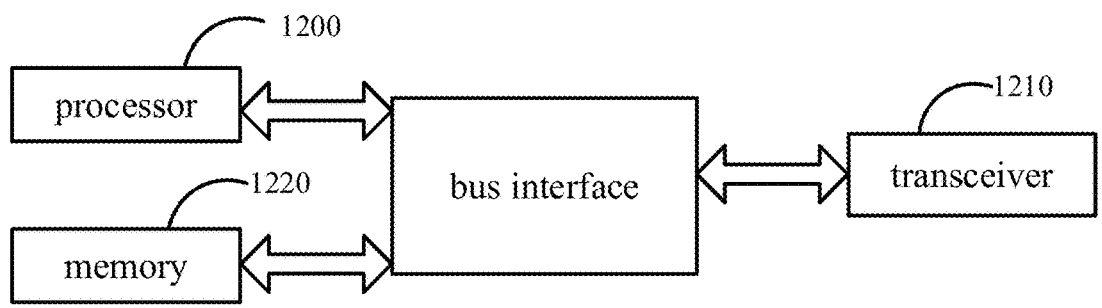
FIG. 12 is a schematic view of another terminal in an embodiment of the present disclosure.

Referring to FIG. 12 which is a schematic view of another terminal in an embodiment of the present disclosure. As shown in FIG. 12, the terminal includes: a transceiver 1210, a memory 1220, a processor 1200, and a program stored in the memory 1220 and executable on the processor 1200;

the transceiver 1210 is configured to receive a first message, where the first message includes first transmission configuration indicator (TCI) state indication information;

the transceiver 1210 is configured to determine, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

the transceiver 1210 is further configured to perform data transmissions in the K transmission layers according to the K TCI states respectively;

or the transceiver 1210 is configured to receive a first message, where the first message includes first transmission configuration indicator (TCI) state indication information;

the processor 1200 is configured to determine, K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

the transceiver 1210 is further configured to perform data transmissions in the K transmission layers according to the K TCI states respectively.

The transceiver 1210 can be configured to receive and send data under the control of the processor 1200.

In FIG. 12, the bus architecture may include any number of interconnected buses and bridges. Specifically, one or more processors represented by the processor 1200 and various circuits of the memory represented by the memory 1220 are linked together. The bus architecture can also link various other circuits such as peripheral devices, voltage regulators, power management circuits, etc., which are all known in the art, and therefore, no further description will be given herein. The bus interface provides the interface. The transceiver 1210 may be a plurality of elements, including a transmitter and a receiver, and provide a unit for communicating with various other devices on the transmission medium. The transceiver 1210 may further include a processing unit to implement the above-mentioned TCI state determination operation.

The processor 1200 is responsible for managing the bus architecture and general processing, and the memory 1220 can store data used by the processor 1200 when performing operations.

It should be noted that the memory 1220 is not limited to being only on the terminal, and the memory 1220 and the processor 1200 may be separated in different geographic locations.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

Optionally, the first message further includes indication information configured to indicate a quantity of layers used for data transmission.

Optionally, different TCI states correspond to different network nodes.

Optionally, in a case that K is an integer greater than 1 and a same TCI state exists in the K TCI states, the terminal performs the data transmission with a same network node according to the same TCI state.

Optionally, prior to the receiving by the terminal the first message, the transceiver 1210 is further configured to receive a second message, where the second message includes the TCI configuration information.

Optionally, prior to the receiving by the terminal the second message, the transceiver 1210 is further configured to receive a third message, where the third message includes second TCI state indication information;

the transceiver 1210 or the processor 1200 is further configured to determine the TCI state indicated by the second TCI state indication information, according to a second correspondence relationship combination, where the second correspondence relationship combination is a correspondence relationship combination, not belonging to the TCI configuration information, of the TCI states and the second TCI state indication information;

the receiving the second message includes:

receiving, by the terminal, the second message, according to the TCI state indicated by the second TCI state indication information.

Optionally, the transceiver is further configured to receive a media access control (MAC) control unit (CE), where the MAC CE is configured to change at least one group of correspondence relationships in the TCI configuration information.

It should be noted that the above-mentioned terminal in this embodiment may be a terminal in any embodiment in the method embodiment in the embodiment of the present disclosure, and any embodiment of the terminal in the method embodiment in the embodiment of the disclosure may be modified by the terminal in the method embodiment in this embodiment. The foregoing terminal realizes and achieves the same beneficial effects, and will not be repeated here.

Figure 13:
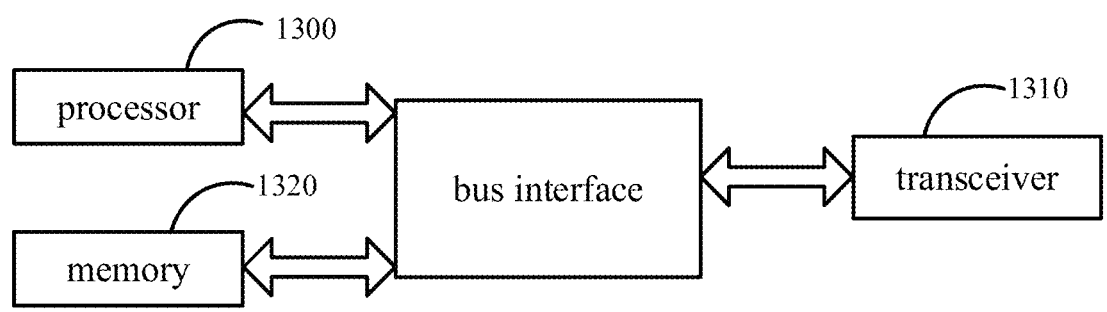
FIG. 13 is a schematic view of another network side device in an embodiment of the present disclosure.

Referring to FIG. 13 which is a schematic view of another network side device in an embodiment of the present disclosure. As shown in FIG. 13, the network side device includes: a transceiver 1310, a memory 1320, a processor 1300 and a program stored in the memory 1320 and executable on the processor 1300;

the transceiver 1310 is configured to send a first message to a terminal, where the first message includes first transmission configuration indicator (TCI) state indication information, to enable the terminal to determine K TCI states of K transmission layers indicated by the first TCI state indication information, according to a first correspondence relationship combination included in pre-acquired TCI configuration information, where the TCI configuration information at least includes a correspondence relationship combination configured to indicate correspondence relationships between TCI states of a plurality of transmission layers and the first TCI state indication information, the first correspondence relationship combination is configured to indicate the correspondence relationship between the TCI states of the K transmission layers and the first TCI state indication information, K is a quantity of layers used for data transmission;

the transceiver 1310 is further configured to perform data transmissions in the K transmission layers according to the K TCI states respectively.

The transceiver 1310 may be configured to receive and send data under the control of the processor 1300.

In FIG. 13, the bus architecture may include any number of interconnected buses and bridges. Specifically, one or more processors represented by the processor 1300 and various circuits of the memory represented by the memory 1320 are linked together. The bus architecture can also link various other circuits such as peripherals, voltage regulators, and power management circuits, etc., which are all known in the art, and therefore, will not be further described in this article. The bus interface provides the interface. The transceiver 1310 may be a plurality of elements, including a transmitter and a receiver, and provide a unit for communicating with various other devices on the transmission medium.

The processor 1300 is responsible for managing the bus architecture and general processing, and the memory 1320 can store data used by the processor 1300 when performing operations.

It should be noted that the memory 1320 is not limited to being only on the network side device, and the memory 1320 and the processor 1300 may be separated in different geographic locations.

Optionally, the TCI configuration information includes a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

Optionally, the TCI configuration information includes M groups of correspondence relationship combinations, M is a maximum quantity of transmission layers supported by the terminal, where the correspondence relationship combination with m transmission layers is configured to indicate the correspondence relationships between the TCI states of the m transmission layers and the first TCI state indication information, m is any integer from 1 to the M.

Optionally, the first message further includes indication information configured to indicate a quantity of layers used for data transmission.

Optionally, different TCI states correspond to different network nodes.

Optionally, in a case that K is an integer greater than 1 and a same TCI state exists in the K TCI states, the terminal performs the data transmission with a same network node according to the same TCI state.

Optionally, prior to the sending by the network side device the first message to the terminal, the transceiver 1310 is further configured to send a second message to the terminal, where the second message includes the TCI configuration information.

Optionally, prior to the sending by the network side device the second message to the terminal, the transceiver 1310 is further configured to send a third message to the terminal, where the third message includes second TCI state indication information, to enable the terminal to determine, according to a second correspondence relationship combination, the TCI state indicated by the second TCI state indication information, where the second correspondence relationship combination is a correspondence relationship combination, not belonging to the TCI configuration information, of the TCI states and the second TCI state indication information, and the terminal receives the second message, according to the TCI state indicated by the second TCI state indication information.

Optionally, the transceiver 1310 is further configured to send a media access control (MAC) control unit (CE) to the terminal, where the MAC CE is configured to change at least one group of correspondence relationships in the TCI configuration information.

It should be noted that the above-mentioned network side device in this embodiment may be a network side device in any embodiment in the method embodiment in the embodiments of the present disclosure, and any embodiment of the network side device in the method embodiment in the embodiment of the disclosure may be It is implemented by the above-mentioned network side device in this embodiment and achieves the same beneficial effects, which will not be repeated here.

A computer-readable storage medium storing a computer program is further provided in an embodiment of the present disclosure, where the computer program is executed by a processor to perform data transmission method at the terminal side, or the computer program is executed by a processor to perform data transmission method at the network node side.

In the several embodiments provided in this application, it should be understood that the disclosed method and device can be implemented in other ways. For example, the device embodiments described above are only illustrative. For example, the division of the units is only a logical function division, and there may be other divisions in actual implementation, for example, a plurality of units or components may be combined or it can be integrated into another system, or some elements can be ignored or not implemented. In addition, the displayed or discussed mutual coupling or direct coupling or communication connection may be indirect coupling or communication connection through some interfaces, devices or units, and may be in electrical, mechanical or other forms.

In addition, the functional units in the various embodiments of the present disclosure may be integrated into one processing unit, or each unit may be separately physically included, or two or more units may be integrated into one unit. The above-mentioned integrated unit may be implemented in the form of hardware, or may be implemented in the form of hardware plus software functional units.

The above-mentioned integrated unit implemented in the form of a software functional unit may be stored in a computer readable storage medium. The above-mentioned software functional unit is stored in a storage medium and includes several instructions to make a computer device (which may be a personal computer, a server, or a network device, etc.) execute part of the information data block processing method described in the various embodiments of the present disclosure step. The aforementioned storage media include: U disk, mobile hard disk, read-only memory (Read-Only Memory, ROM), random access memory (Random Access Memory, RAM), magnetic disks or optical disks, etc., which can store program codes. Medium.

A person of ordinary skill in the art may be aware that the units and algorithm steps described in the examples in combination with the embodiments disclosed herein can be implemented by electronic hardware or a combination of computer software and electronic hardware. Whether these functions are executed by hardware or software depends on the specific application and design constraint conditions of the technical solution. Professionals and technicians can use different methods for each specific application to implement the described functions, but such implementation should not be considered as going beyond the scope of the present disclosure.

Those skilled in the art can clearly understand that, for the convenience and conciseness of description, the specific working process of the above-described system, device, and unit can refer to the corresponding process in the foregoing method embodiment, which is not repeated here.

The units described as separate components may or may not be physically separated, and the components displayed as units may or may not be physical units, that is, they may be located in one place, or they may be distributed on a plurality of network units. Some or all of the units may be selected according to actual needs to achieve the objectives of the solutions of the embodiments.

In addition, the functional units in the various embodiments of the present disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the present disclosure essentially or the part that contributes to the related technology or the part of the technical solution can be embodied in the form of a software product, and the computer software product is stored in a storage medium, including several The instructions are configured to make a computer device (which may be a personal computer, a server, or a network device, etc.) execute all or part of the steps of the methods described in the various embodiments of the present disclosure. The aforementioned storage media include: U disk, mobile hard disk, ROM, RAM, magnetic disk or optical disk and other media that can store program codes.

A person of ordinary skill in the art can understand that all or part of the processes in the above-mentioned embodiment methods can be implemented by controlling the relevant hardware through a computer program. The program can be stored in a computer readable storage medium. When executed, it may include the procedures of the above-mentioned method embodiments. The storage medium may be a magnetic disk, an optical disk, ROM or RAM, etc.

It can be understood that the embodiments described in the embodiments of the present disclosure can be implemented by hardware, software, firmware, middleware, microcode, or a combination thereof. For hardware implementation, the processing unit can be implemented in one or more application specific integrated circuits (ASIC), digital signal processor (digital signal processor, DSP), digital signal processing device (DSP device, DSPD), programmable Logic devices (programmable logic device, PLD), field-programmable gate array (field-programmable gate array, FPGA), general-purpose processors, controllers, microcontrollers, microprocessors, and others for performing the functions described in this disclosure Electronic unit or its combination.

For software implementation, the technology described in the embodiments of the present disclosure can be implemented through modules (for example, procedures, functions, etc.) that perform the functions described in the embodiments of the present disclosure. The software codes can be stored in the memory and executed by the processor. The memory can be implemented in the processor or external to the processor.

The above are some embodiments of the present disclosure. It should be pointed out that for those of ordinary skill in the art, without departing from the principles of the present disclosure, several improvements and modifications can be made. These improvements and modifications should also be regarded as the scope of the present disclosure.

What is claimed is:

1. A data transmission method, comprising:
   receiving, by a terminal, a first message, wherein the first message comprises first transmission configuration indicator (TCI) state indication information;
   determining, by the terminal, K TCI states of K transmission layers indicated by the first TCI state indication information, according to a first correspondence relationship combination included in pre-acquired TCI configuration information, wherein the TCI configuration information at least comprises a correspondence relationship combination configured to indicate correspondence relationships between TCI states of a plurality of transmission layers and the first TCI state indication information, the first correspondence relationship combination is from the correspondence relationships and configured to indicate a correspondence relationship between the TCI states of the K transmission layers and the first TCI state indication information, K is a quantity of layers used for data transmission; and
   performing, by the terminal, data transmissions in the K transmission layers according to the K TCI states respectively;
   wherein prior to the receiving by the terminal the first message, the method further comprises:
   receiving, by the terminal, a second message, wherein the second message comprises the TCI configuration information;
   wherein prior to the receiving by the terminal the second message, the method further comprises:
   receiving, by the terminal, a third message, wherein the third message comprises second TCI state indication information;
   determining, by the terminal, the TCI state indicated by the second TCI state indication information, according to a second correspondence relationship combination, wherein the second correspondence relationship combination is a correspondence relationship combination, not belonging to the TCI configuration information, of the TCI states and the second TCI state indication information;
   the receiving by the terminal the second message comprises:
   receiving, by the terminal, the second message, according to the TCI state indicated by the second TCI state indication information.

2. The method according to claim 1, wherein the TCI configuration information comprises a plurality of groups of correspondence relationship combinations, and different correspondence relationship combinations correspond to different quantities of transmission layers;
   the first correspondence relationship combination is a correspondence relationship combination in which a quantity of transmission layers is K in the configuration information.

3. The method according to claim 2, wherein the TCI configuration information comprises M groups of correspondence relationship combinations, M is a maximum quantity of transmission layers supported by the terminal, wherein the correspondence relationship combination with m transmission layers is configured to indicate the correspondence relationships between the TCI states of the m transmission layers and the first TCI state indication information, m is any integer from 1 to the M.

4. The method according to claim 1, wherein the first message further comprises indication information configured to indicate a quantity of layers used for the data transmission.

5. The method according to claim 1, wherein different TCI states correspond to different network nodes.

6. The method according to claim 5, wherein in a case that K is an integer greater than 1 and a same TCI state exists in the K TCI states, the terminal performs the data transmission with a same network node according to the same TCI state.

7. The method according to claim 1, further comprising:
   receiving, by the terminal, a media access control (MAC) control unit (CE), wherein the MAC CE is configured to change at least one group of correspondence relationships in the TCI configuration information.

8. A data transmission method, comprising:
   sending, by a network side device, a first message to a terminal, wherein the first message comprises first transmission configuration indicator (TCI) state indication information, to enable the terminal to determine K TCI states of K transmission layers indicated by the first TCI state indication information, according to a first correspondence relationship combination included in pre-acquired TCI configuration information, wherein the TCI configuration information at least comprises a correspondence relationship combination configured to indicate correspondence relationships between TCI states of a plurality of transmission layers and the first TCI state indication information, the first correspondence relationship combination is from the correspondence relationships and configured to indicate a correspondence relationship between the TCI states of the K transmission layers and the first TCI state indication information, K is a quantity of layers used for data transmission; and
   performing, by the network side device, data transmissions in the K transmission layers according to the K TCI states respectively;

wherein prior to the sending by the network side device the first message to the terminal, the method further comprises:

sending, by the network side device, a second message to the terminal, wherein the second message comprises the TCI configuration information;

wherein prior to the sending by the network side device the second message to the terminal, the method further comprises:

sending, by the network side device, a third message to the terminal, wherein the third message comprises second TCI state indication information, to enable the terminal to determine, according to a second correspondence relationship combination, the TCI state indicated by the second TCI state indication information, wherein the second correspondence relationship combination is a correspondence relationship combination, not belonging to the TCI configuration information, of the TCI states and the second TCI state indication information, and the terminal receives the second message, according to the TCI state indicated by the second TCI state indication information.

9. The method according to claim 8, wherein the TCI configuration information comprises a plurality of groups of correspondence relationship combinations, and different correspondence relationship combinations correspond to different quantities of transmission layers;

the first correspondence relationship combination is a correspondence relationship combination in which a quantity of transmission layers is K in the configuration information.

10. The method according to claim 9, wherein the TCI configuration information comprises M groups of correspondence relationship combinations, M is a maximum quantity of transmission layers supported by the terminal, wherein the correspondence relationship combination with m transmission layers is configured to indicate the correspondence relationships between the TCI states of the m transmission layers and the first TCI state indication information, m is any integer from 1 to the M.

11. The method according to claim 8, wherein the first message further comprises indication information configured to indicate a quantity of layers used for the data transmission.

12. The method according to claim 8, wherein different TCI states correspond to different network nodes.

13. The method according to claim 12, wherein in a case that K is an integer greater than 1 and a same TCI state exists in the K TCI states, the terminal performs the data transmission with a same network node according to the same TCI state.

14. The method according to claim 8, further comprising:

sending, by the network side device, a media access control (MAC) control unit (CE) to the terminal, wherein the MAC CE is configured to change at least one group of correspondence relationships in the TCI configuration information.

15. A terminal, comprising: a transceiver, a memory, a processor and a program stored in the memory and executable on the processor, wherein the transceiver is configured to receive a first message, wherein the first message comprises first transmission configuration indicator (TCI) state indication information;

the transceiver or the processor is configured to determine, K TCI states of K transmission layers indicated by the first TCI state indication information, according to a first correspondence relationship combination included in pre-acquired TCI configuration information, wherein the TCI configuration information at least comprises a correspondence relationship combination configured to indicate correspondence relationships between TCI states of a plurality of transmission layers and the first TCI state indication information, the first correspondence relationship combination is from the correspondence relationships and configured to indicate a correspondence relationship between the TCI states of the K transmission layers and the first TCI state indication information, K is a quantity of layers used for data transmission; and the transceiver is further configured to perform data transmissions in the K transmission layers according to the K TCI states respectively;

wherein prior to receiving the first message, the transceiver is configured to receive a second message, wherein the second message comprises the TCI configuration information;

wherein prior to receiving the second message, the transceiver is configured to receive a third message, wherein the third message comprises second TCI state indication information;

the transceiver or the processor is configured to determine the TCI state indicated by the second TCI state indication information, according to a second correspondence relationship combination, wherein the second correspondence relationship combination is a correspondence relationship combination, not belonging to the TCI configuration information, of the TCI states and the second TCI state indication information;

the transceiver is configured to receive the second message, according to the TCI state indicated by the second TCI state indication information.

16. A network side device, comprising: a transceiver, a memory, a processor and a program stored in the memory and executable on the processor, wherein the program is executed by the processor to perform the data transmission method according to claim 8.

* * * * *